United States Patent
Ekambaram et al.

(10) Patent No.: US 11,586,858 B2
(45) Date of Patent: *Feb. 21, 2023

(54) IMAGE OBJECT RECOGNITION THROUGH MULTIMODAL CONVERSATION TEMPLATES

(71) Applicant: International Business Machines Corporation, Armonk, NY (US)

(72) Inventors: Vijay Ekambaram, Bangalore (IN); Ravindranath Kokku, Yorktown Heights, NY (US); Prasenjit Dey, Bangalore (IN); Ruhi Sharma Mittal, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 158 days.

This patent is subject to a terminal disclaimer.

(21) Appl. No.: 17/137,765

(22) Filed: Dec. 30, 2020

(65) Prior Publication Data

US 2021/0117732 A1    Apr. 22, 2021

Related U.S. Application Data

(63) Continuation of application No. 16/267,927, filed on Feb. 5, 2019, now Pat. No. 10,915,795.

(51) Int. Cl.
*G06K 9/62* (2022.01)
*G06F 16/28* (2019.01)
*G06V 20/80* (2022.01)

(52) U.S. Cl.
CPC ......... *G06K 9/6267* (2013.01); *G06F 16/285* (2019.01); *G06V 20/80* (2022.01)

(58) Field of Classification Search
CPC . G06K 9/6267; G06K 9/00577; G06F 16/285
See application file for complete search history.

(56) References Cited

U.S. PATENT DOCUMENTS

| 6,584,223 B1 | 6/2003 | Shiiyama |
| 8,213,726 B2 | 7/2012 | Kohli et al. |

(Continued)

OTHER PUBLICATIONS

Yining L et al. Learning to Disambiguate by Asking Discriminative Questions; Source: arXiv : 1708.02760v1 [cs.CV], Published on Aug. 9, 2017. Publisher: Cornell University Library.

(Continued)

*Primary Examiner* — Ming Y Hon
(74) *Attorney, Agent, or Firm* — Ryan, Mason & Lewis, LLP (57) ABSTRACT

An exemplary method includes obtaining a group of classification labels and corresponding confidence values for at least one object identified within an image using a computer-based object recognition technique; generating a conversation, to resolve ambiguity among the classification labels, the generating including iteratively performing the following when (i) each of the confidence values is below a threshold value or (ii) two or more of the confidence values are above the threshold value: using a wordweb to identify properties that distinguish between a first one and a second one of the labels, ranking the properties; selecting the property having the highest rank to generate a question, and filtering at least one of the first and second label based on user input received in response to the question; and when only one of the confidence values exceeds the threshold value, classifying the object using the label corresponding to the one confidence value.

20 Claims, 6 Drawing Sheets

(56) References Cited

U.S. PATENT DOCUMENTS

| | | | |
|---|---|---|---|
| 9,654,303 | B2 | 5/2017 | Joyner et al. |
| 10,162,886 | B2 | 12/2018 | Wang et al. |
| 10,275,687 | B2 | 4/2019 | Dey et al. |
| 10,354,543 | B2 | 7/2019 | Chetlur et al. |
| 2014/0247977 | A1 | 9/2014 | Han |
| 2015/0149155 | A1 | 5/2015 | Zadeh |
| 2015/0310301 | A1* | 10/2015 | Zadeh ............ G06N 5/046 382/199 |
| 2016/0171682 | A1 | 6/2016 | Abedini et al. |
| 2016/0283587 | A1 | 9/2016 | Murthy et al. |
| 2017/0076222 | A1 | 3/2017 | Khapra et al. |
| 2017/0293725 | A1* | 10/2017 | Liu ............ G06F 16/24522 |
| 2018/0150444 | A1* | 5/2018 | Kasina ............ G06F 16/4393 |
| 2018/0181881 | A1* | 6/2018 | Du ............ G06N 20/00 |
| 2019/0164240 | A1* | 5/2019 | Barbara ............ G06F 16/909 |
| 2019/0370613 | A1* | 12/2019 | Arngren ............ G06N 20/10 |
| 2020/0042824 | A1* | 2/2020 | Marder ............ G06T 7/70 |
| 2020/0082168 | A1* | 3/2020 | Fathi ............ G06V 20/176 |

OTHER PUBLICATIONS

Szegedy, C., Vanhoucke, V., Ioffe, S., Shlens, J., & Wojna, Z. (2015). Rethinking the inception architecture for computer vision. arXiv preprint arXiv:1512.00567.

GuessWhat?! Visual object discovery through multi-modal dialogue, https://arxiv.org/pdf/1611.08481.pdf, Feb. 6, 2017.

Noh et al. Image Question Answering using Convolutional Neural Network with Dynamic Parameter Prediction; https://www.cv-foundation.org/openaccess/content_cvpr_2016/papers/oh_Image_Question_Answering_CVPR_2016_paper.pdf, 2016.

Zhang et al. Yin and Yang: Balancing and Answering Binary Visual Questions, https://arxiv.org/pdf/1511.05099.pdf, Apr. 19, 2016.

Agrawal et al. VQA: Visual Question Answering; https://arxiv.org/pdf/1505.00468v6.pdf, Apr. 20, 2016.

Wang et al. Knowledge Guided Disambiguation for Large-Scale Scene Classification with Multi-Resolution CNNs; https://arxiv.org/pdf/1610.01119.pdf, Feb. 21, 2017.

Mostafazadeh et al. Generating Natural Questions About an Image; https://arxiv.org/pdf/1603.06059.pdf, Jun. 9, 2016.

Li et al. Visual Question Generation as Dual Task of Visual Question Answering; https://arxiv.org/pdf/1709.07192.pdf, Sep. 21, 2017.

Ekambaram et al. "Tell Me More: Digital Eyes to the Physical World for Early Childhood Learning." EDM 2017.

Mostafazadeh et al. Image-Grounded Conversations: Multimodal Context for Natural Question and Response Generation, Apr. 20, 2017.

List of IBM Patents or Applications Treated as Related.
List of IBM Patents or Patent Applications Treated as Related.

* cited by examiner

IMAGE OBJECT RECOGNITION THROUGH MULTIMODAL CONVERSATION TEMPLATES

CROSS-REFERENCE TO RELATED APPLICATIONS

The present application is a continuation of U.S. patent application Ser. No. 16/267,927 (now U.S. Pat. No. 10,915, 795), filed Feb. 5, 2019, which is incorporated by reference herein in its entirety.

BACKGROUND

The present application generally relates to information technology and, more particularly, to image recognition techniques.

Commonly, people learn when they are involved in activities. Using physical-digital coupling, people can attach words to the things that they experience.

Current learning applications with physical-digital interaction generally fall into two categories: application-initiated activities and user-initiated activities. In application-initiated activities, an application provides the user a context, and the user is required to, for example, find a relevant physical object and take a picture. In user-initiated activities, the user takes a picture of an object that the user wants to know more about. However, few applications allow interaction with a user through digital objects.

SUMMARY

In one embodiment of the present invention, techniques for image object recognition through multimodal conversation templates are provided. An exemplary computer-implemented method includes obtaining a group of classification labels and corresponding confidence values for at least one object identified within an image using a computer-based object recognition technique; generating a conversation with a user to resolve ambiguity among two or more of the classification labels in the group, wherein said generating comprises iteratively performing the following when (i) each of the confidence values is below a first threshold value or (ii) two or more of the confidence values are above the first threshold value: using a wordweb to identify one or more properties that distinguish between at least a first one of the classification labels and at least a second one of the classification labels within the group, ranking the identified one or more properties based at least in part on which of the properties is capable of reducing the length of the conversation, generating and outputting a question to the user based on the property having the highest rank, and filtering at least one of the first classification label and the second classification label, based at least in part on user input received in response to said outputting; and in response to determining that only one of the confidence values exceeds the first threshold value, classifying the at least one object using the classification label corresponding to the one confidence value that exceeds the first threshold value.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Some challenges in implementing applications that allow interaction with a user through digital objects include, for example, accurate detection of objects in images and detecting particular objects in noisy images (i.e., images which include multiple objects in a frame). Various exemplary embodiments herein describe techniques for image object recognition through multimodal conversation templates, which address these and other challenges.

Figure 1:
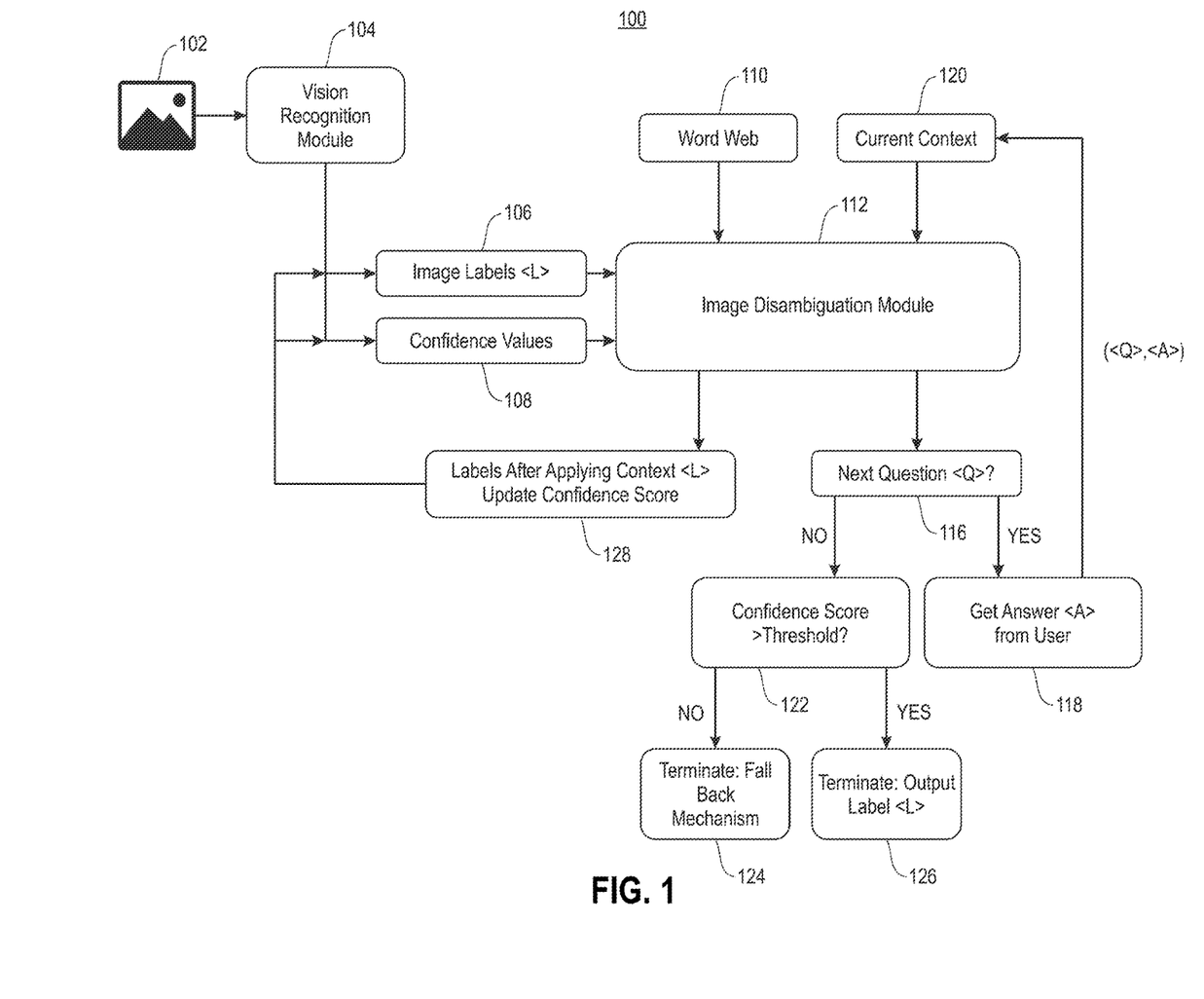
FIG. 1 is a diagram illustrating a system architecture, according to an exemplary embodiment of the invention.

Referring to FIG. 1, this figure is a simplified block diagram illustrating a system architecture according to various example embodiments of the invention. By way of illustration, FIG. 1 depicts a vision recognition module 104 and an image disambiguation module 112 which leverages a wordweb 110 to help identify one or more objects within an image 102 through multimodal conversations. These and other features of FIG. 1 are described in more detail below.

The vision recognition module 104 receives an image 102 as input (such as via user input, for example). The vision recognition module 104 identifies an object within the image and outputs a set of image labels 106 and a corresponding set of confidence values 108 for the object. The confidence values 108 indicate a confidence level of the image recognition module 112 for the various image labels 106. As an example, if an image 102 includes a tiger, then the vision recognition module 104 may output a set of predicted image labels 106 (such as the top-k predicted labels, for example) and a set of corresponding confidence levels 108 related to the tiger in the image 102. In this example, the output from the vision recognition module 104 may be the following set of labels: {Tiger, Pig, Zebra, Dog} and the following corresponding set of confidence levels: {0.7, 0.1, 0.6, 0.5}. As such, the sets indicate the vision recognition module 104 is, for example, 70% confident that the image is of a tiger. It is understood that this is merely an example, and the form (or notation) of the output 106, 108 may be different, such as:

{<Tiger, 0.7>, <Pig, 0.1>, <Zebra, 0.6>, <Dog, 0.5>} or {Tiger (0.7), Pig (0.1), Zebra (0.6), Dog (0.5)}, as non-limiting examples.

If confusion exists across the image labels 106 (e.g., across the top-k predicted labels) based on the confidence values 108, then the image disambiguation module 112 leverages the knowledge of a wordweb 120 to intelligently generate various questions based on distinct properties across the image labels 106. As a non-limiting example, confusion may exist when each of the confidence values 108 is below a first threshold value, or when two or more of the confidence values 108 are above the first threshold value. 'Distinct properties' refer to the properties which vary across the image labels 106 in the wordweb 110. In some examples, the image disambiguation module 112 may apply various heuristics to, for example, reduce the number of conversation turns or make the conversation 'simple' while still distinguishing between the image labels 106.

If there is a question generated by image disambiguation module 112 at block 116, then the user is presented with the question, and the user's answer (which may be provided via user input, for example) is received at 118. The current context 120 is updated based on the question and answer. Based on the answer(s) received from the user (e.g., yes, no, not sure), one or more labels may be removed from the set of image labels 106, and/or the confidence values of one or more labels may be updated as represented by block 128. If confusion still exists among the labels, then the image disambiguation module 112 may iteratively generate questions using the wordweb 110, and update the image labels 106 and/or updated confidence values 108 based on the current context 120.

The image disambiguation module 112 asks additional questions until a size of the image label 106 set becomes one. If there are no questions at 116, then the confidence value corresponding to the one remaining image label is compared to a threshold value at 122. If the confidence value is greater than (or equal to) the threshold value, then the object is classified with the corresponding image label (and possibly output to the user). If the corresponding confidence value does not exceed the threshold value at 122, then the process may terminate and a fallback mechanism may be utilized as shown at 124. The fallback mechanism may, for example, include generating a message to the user indicating the object cannot be classified, or generating additional questions to present to the user for increasing the confidence value above the threshold value.

It is noted that a 'wordweb' (such as wordweb 110), as used herein, generally refers to a network of words and semantic relationships between the words. For example, the wordweb may define one or more relationships between two words. Some non-limiting examples of relationships between two words in a wordweb include: atLocation (e.g., "Giraffe atLocation Grassland"); hasA (e.g., "Bicycle hasA Wheel"); isA (e.g., "Lion isA mammal"); capableOf (e.g., "Flamingo capableOf Flying"); and usedFor (e.g., "Car usedFor Transport"). In some examples, a wordweb may be represented by a graph where nodes of the graphs correspond to individual words, and edges between nodes in the graph represents a relationship between the two words. In some examples, a wordweb may be specially curated for a specific group of users (such as for a particular age group of users, for example). Although example embodiments are generally described herein as implementing wordwebs, this is not intended to be limiting, and, in general, embodiments may also be implemented using any suitable knowledge graph.

Figure 2:
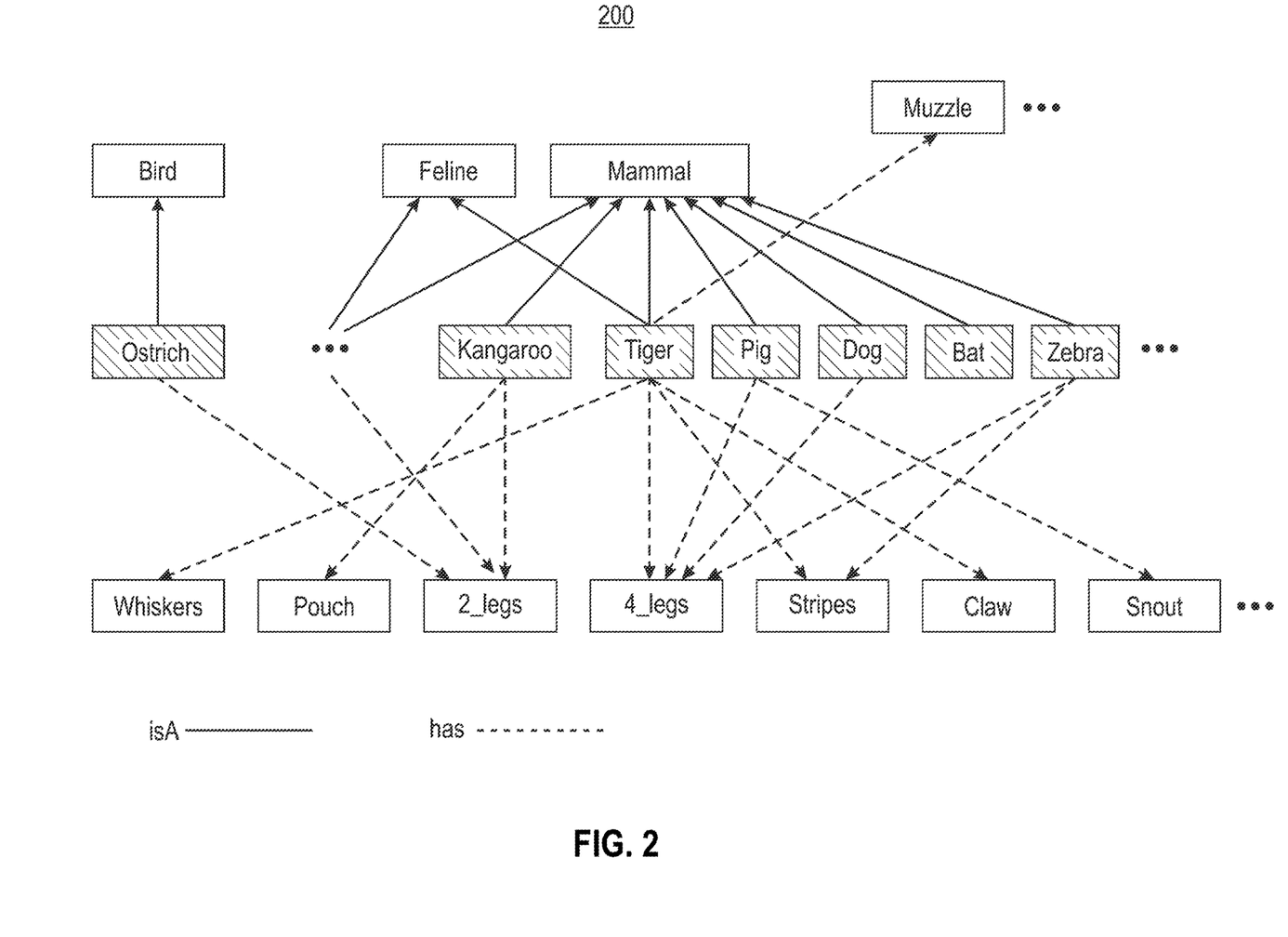
FIG. 2 is a diagram illustrating an example of a wordweb, according to an exemplary embodiment of the invention.

FIG. 2 shows an example of a wordweb in accordance with various example embodiments. The wordweb 200 includes entity nodes (i.e., nodes with darker shading) corresponding to words of different animals, and property nodes (i.e., unshaded nodes) corresponding to different properties of the different animals. The dotted arrows indicate a 'hasA' relationship and the solid arrows indicate an 'isA' relationship between nodes. Thus, it can be determined from wordweb 200 that, for example, a 'tiger' is a mammal, and has a muzzle, four legs, whiskers, stripes, and a claw. It is noted that only part of the wordweb 200 is shown, and other animals, properties, and/or relationships may be included in the wordweb 200.

According to at least one example embodiment, different parameters (such as corresponding to different properties in a wordweb, for example) are used for intelligently prioritizing and/or selecting the nodes in the wordweb, which may then be used to form questions. The parameters may include, for example:

a parameter corresponding to the number of connections between a given node and nodes in the 'confused' set of entity nodes, i.e., those entity nodes where confusion exists (selecting nodes based on this parameter generally effects the amount of turns in the conversation); and/or a parameter corresponding to the number of connections between a given node and all entity nodes (selecting nodes based on this parameter generally relates to how likely the user is to understand a node);

a parameter related to confidence values of various image labels; and/or a parameter corresponding to different relationships defined by the wordweb (such as whether nodes are connected via an isA relationship, a hasA relationship, etc.).

The parameters may be prioritized differently for different algorithms when selecting the nodes. As a non-limiting example, the following algorithm may be used:

1. Sort the property nodes in the wordweb based on the number of connections between a given property node and the confused set of entity nodes to prioritize nodes that help reduce the total number of conversation turns.
2. Sort the property nodes with the most connections from step 1 based on the number of connections to all entity nodes in the wordweb to prioritize the nodes related to more 'common' properties that thus may be more familiar to the user.
3. For property nodes having the same number of connections for step 2, sort the property nodes based on corresponding confidence values of the entity nodes.

It should be understood that the algorithm above is merely an example, and other algorithms to select and/or prioritize the nodes are equally suitable, such as using different parameters and/or sorting using different orders of parameters, for instance. In some examples, the parameters may also include parameters relating to learner models, word embedding representations, and/or other graph heuristics to select questions at each level of conversation.

The following non-limiting example is helpful in understanding features of various example embodiments described herein. Assume a user identifies an image of a tiger (such as by clicking on the image, uploading the image, and/or the like). The image of the tiger is analyzed (such as using vision recognition module 103, for example) to generate the following labels and confidence values: tiger (0.60), pig (0.62), kangaroo (0.63), zebra (0.10), cat (0.09). In accordance with at least one example embodiment, the labels corresponding to the zebra and the cat are discarded as their respective confidence values are below a given threshold value.

Thus, the remaining labels are: tiger (0.60), pig (0.62), kangaroo (0.63). The following differentiating properties are then determined based on wordweb 200: (1) Kangaroo has 2_legs; tigers and pigs have 4_legs; (2) Tiger is a feline, and pig and kangaroo are not felines; and (3) Kangaroo has a pouch whereas pig and tiger do not have a pouch. In this example, "4_legs" is selected based on the relatively higher number of incoming edges to 2_legs and 4_legs. However, as noted above, this selection may be different depending on the selection criteria that is used. The question "Does it has 4_legs?" is generated and presented to the user. If the user replies "yes," then "kangaroo" is removed from the label list and the confidence scores of "Tiger" and "Pig" are increased by some amount, such as 0.1, for example. Next, the following differentiating properties between tiger and pig are determined using the wordweb: (1) tiger has stripes; pig does not have stripes; (2) tiger has muzzle; pig does not have a muzzle. The parameter 'stripes' may be selected (as opposed to 'muzzle' or 'snout') as stripes has relatively more incoming edges in the wordweb. The question "Does it has stripes?" is then generated and presented to the user. If user reply is "yes," then "Pig" is removed from the label list and the confidence value of label "Tiger" is again increased by 0.1. The filtered label list is Tiger (0.80), and the confidence value of tiger is checked against a threshold value (which is assumed to be 0.85 in this example). Because the confidence value for Tiger is still below 0.85, at least one embodiment of the invention includes generating the question "Does it have whiskers?" to confirm that the image is of a tiger. If the user's reply is "yes," then the confidence score of tiger is increased by 0.1, which means the label "Tiger" has a confidence value of 0.90. Output is provided to the user indicating that the uploaded image is classified as a "Tiger".

It is noted that the confidence values in the example above are increased by a static number (i.e., 0.1) in response to the user's answer; however, this is not intended to be limiting and the confidence values may be increased in other ways, such as via user configuration or dynamically depending on how many labels are removed from the list as further non-limiting examples.

Figure 3:
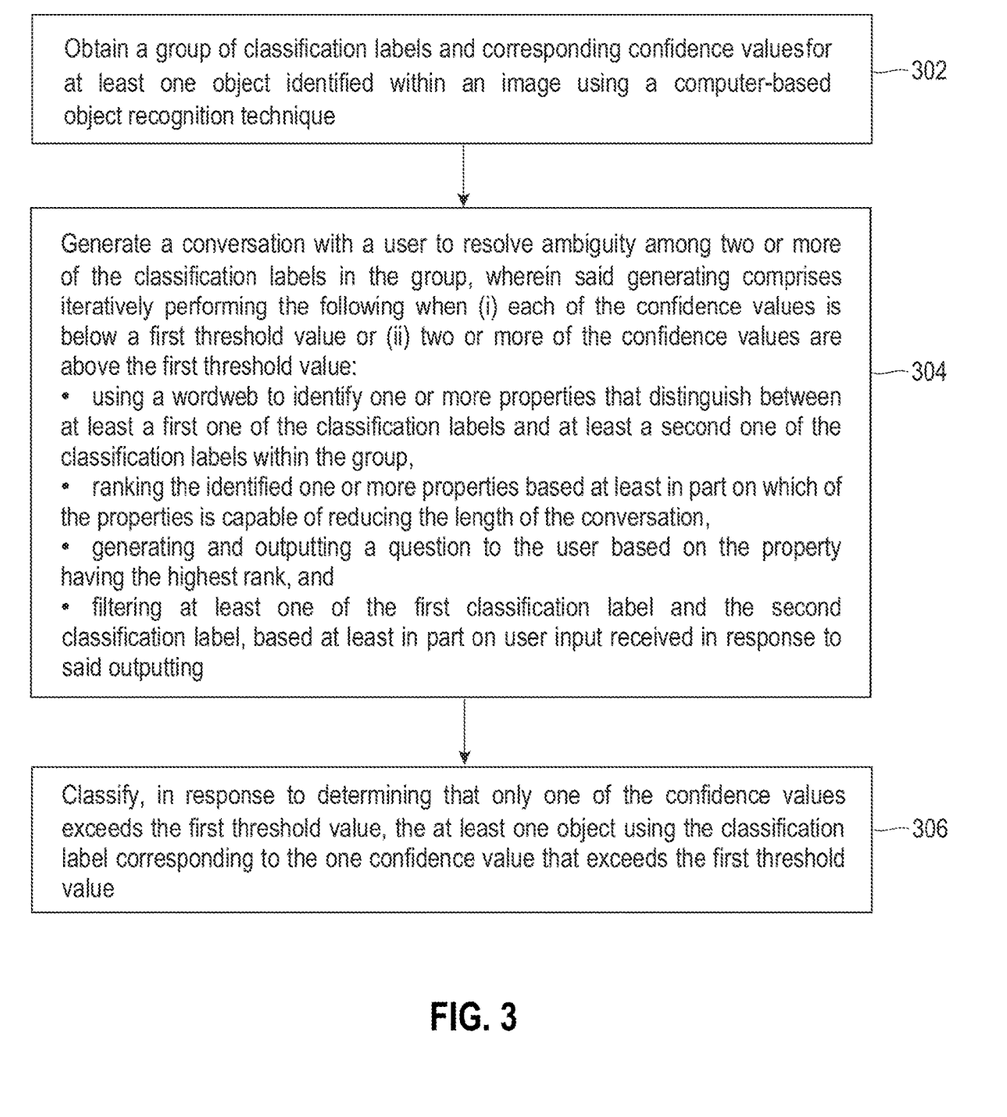
FIG. 3 is a flow diagram illustrating techniques according to an embodiment of the invention.

FIG. 3 is a flow diagram of a process illustrating techniques according to an embodiment of the present invention. Step 302 of the process includes obtaining a group of classification labels and corresponding confidence values for at least one object identified within an image using a computer-based object recognition technique.

Step 304 includes generating a conversation with a user to resolve ambiguity among two or more of the classification labels in the group, wherein said generating comprises iteratively performing the following when (i) each of the confidence values is below a first threshold value or (ii) two or more of the confidence values are above the first threshold value: using a wordweb to identify one or more properties that distinguish between at least a first one of the classification labels and at least a second one of the classification labels within the group, ranking the identified one or more properties based at least in part on which of the properties is capable of reducing the length of the conversation, generating and outputting a question to the user based on the property having the highest rank, and filtering at least one of the first classification label and the second classification label, based at least in part on user input received in response to said outputting.

Step 306 includes, in response to determining that only one of the confidence values exceeds the first threshold value, classifying the at least one object using the classification label corresponding to the one confidence value that exceeds the first threshold value.

The filtering may include at least one of: adjusting the confidence value corresponding to at least one of (i) the first classification label and (ii) the second classification label; and removing at least one of (i) the first classification label and (ii) the second classification label from the group of classification labels. The wordweb may include a graph comprising: first nodes corresponding to a plurality of classification labels, wherein the plurality of classification labels comprises the group of classification labels and one or more other classification labels, second nodes corresponding to one or more properties, and edges defining relationships between the first nodes and the second nodes. The ranking may be further based on which of the properties the user is most likely to understand. The ranking may include determining the properties that the user is most likely to understand based at least in part on a number of edges between a given second node and the plurality classification labels. The ranking may include determining the properties that are capable of reducing the length of the conversation based at least in part on a number edges between a given second node and the first nodes corresponding to only the group of classification labels. The relationships between the first nodes and the second nodes may include one or more of: (i) an atLocation relationship; (ii) a hasA relationship; (iii) an isA relationship; (iv) a capableOf relationship; and (v) a UsedFor relationship. The at least one object may include two or more objects, and wherein said ranking is based at least in part on which properties distinguish between the two or more objects within the image. The process depicted in FIG. 3 may further include a step of removing a given classification label from the group of classification labels when the confidence value corresponding to the given classification label is below a second threshold value. The user input received in response to the question may indicate one of a 'yes' answer, a 'no' answer, and an 'unsure' answer. The image may be provided based on user input. The computer-based object recognition technique may include applying a computer vision process to extract the group of classification labels and the corresponding confidence values.

The techniques depicted in FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 4:
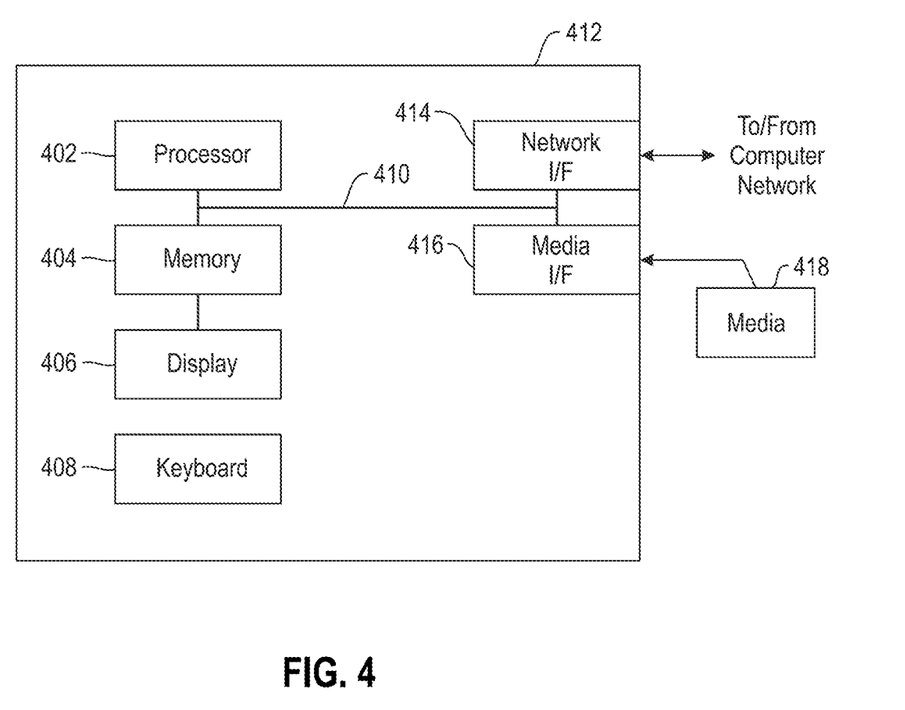
FIG. 4 is a system diagram of an exemplary computer system on which at least one embodiment of the invention can be implemented.

Additionally, an embodiment of the present invention can make use of software running on a computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
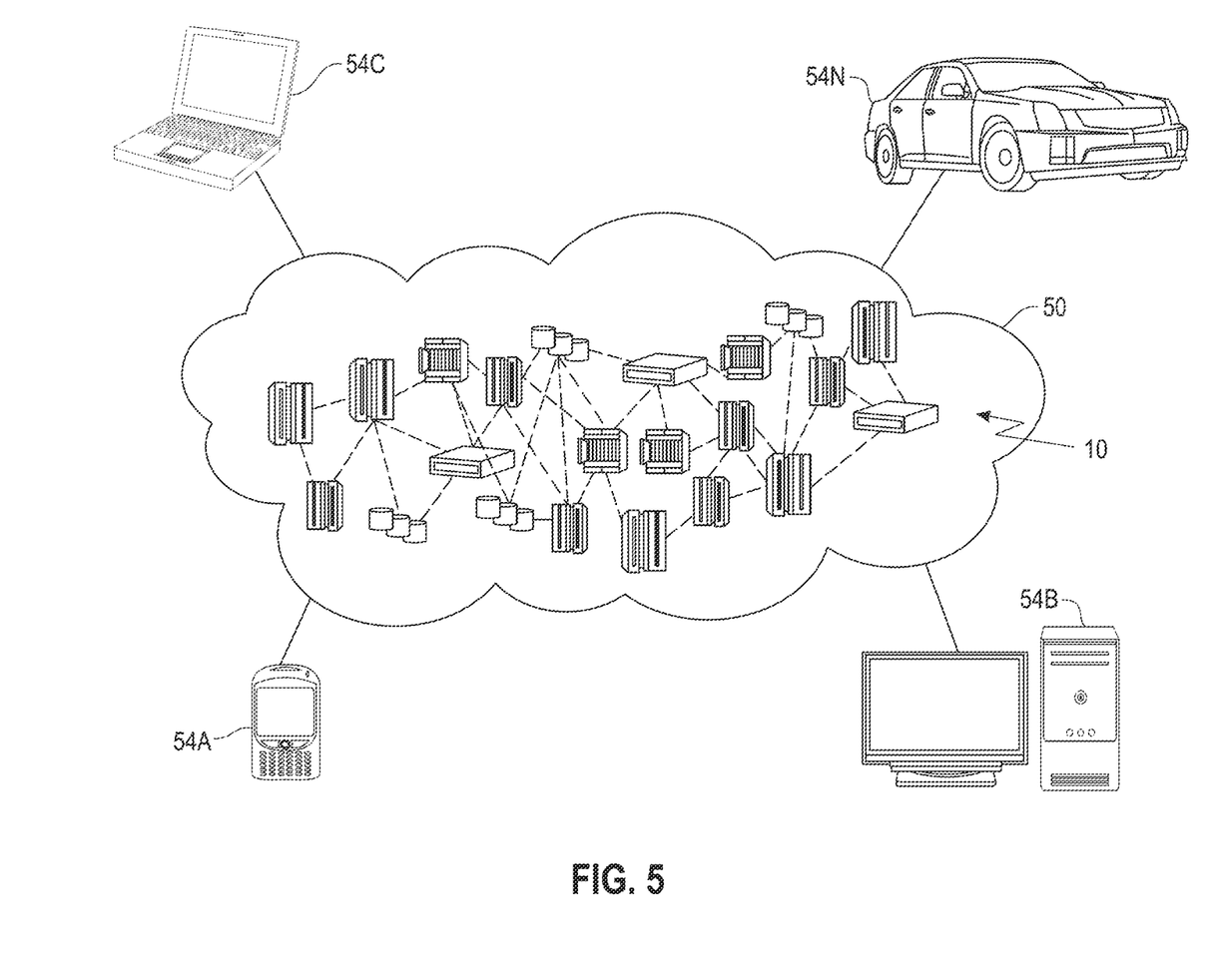
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
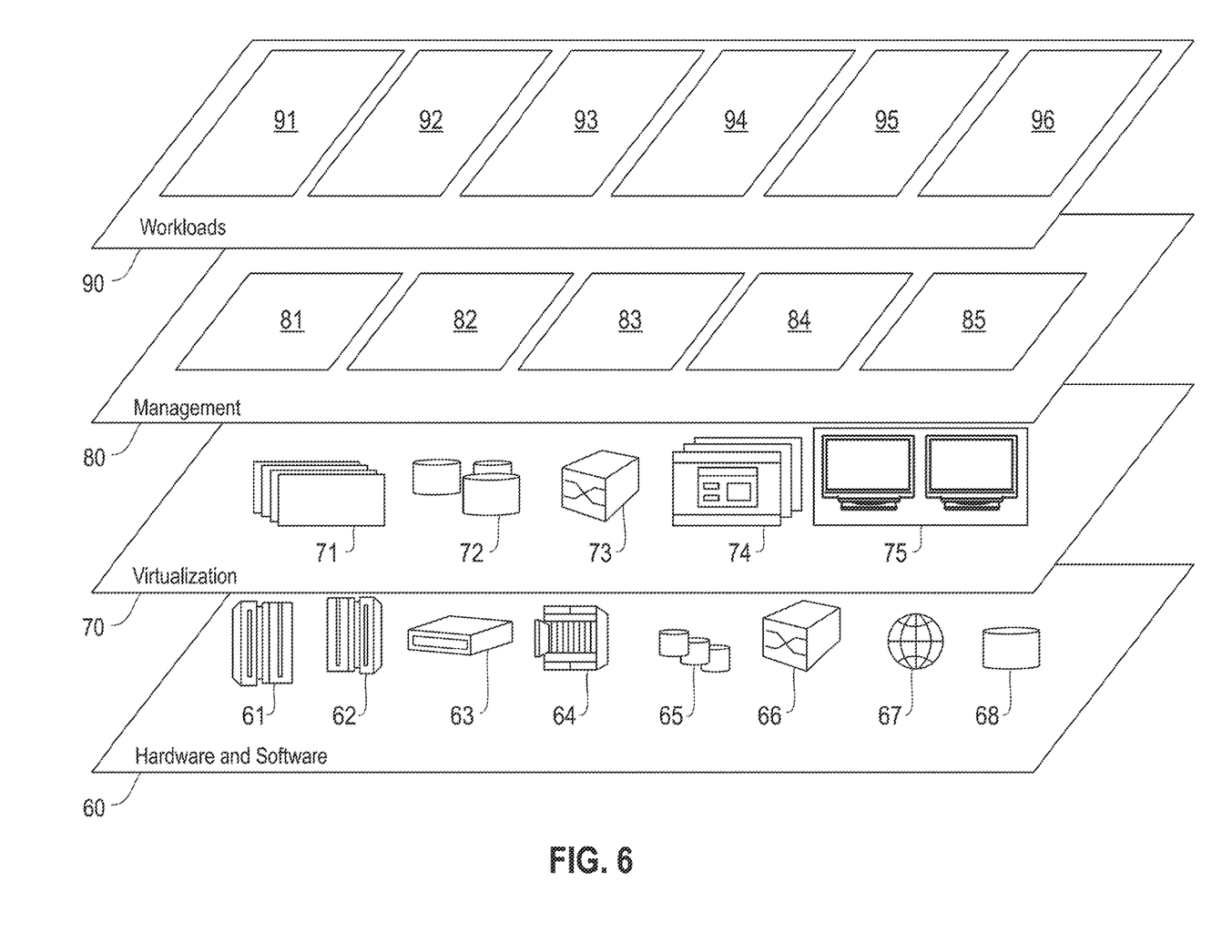
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and image object recognition through multimodal conversation templates 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, resolving disambiguation in object recognition systems through runtime conversation generation from wordweb(s) which has least number of turns. At least one embodiment of the present invention may provide a beneficial effect such as, for example, improving prior user interfaces by allowing less user interaction (e.g. by reducing number of turns) or providing more helpful output to a user that is easy to understand. At least one embodiment of the present invention may provide a beneficial effect such as, for example, intelligently generating output for a specific user via the user interface via specially curated wordwebs. At least one embodiment of the present invention may provide a beneficial effect such as, for example, not requiring large amount of annotated conversation-labelled data.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:
    obtaining a group of classification labels and corresponding confidence values for at least one object identified within an image using a computer-based object recognition process;
    generating a conversation with a user to resolve ambiguity among two or more of the classification labels in the group, wherein said generating comprises iteratively performing the following when each of the confidence values is below a first threshold value or two or more of the confidence values are above the first threshold value:
        using a word-based data structure to identify one or more properties that distinguish between at least a first one of the classification labels and at least a second one of the classification labels within the group,
        ranking the identified one or more properties based at least in part on which of the properties is capable of reducing the length of the conversation,
        generating and outputting a question to the user based on the property having the highest rank, and
        filtering at least one of the first classification label and the second classification label, based at least in part on user input received in response to said outputting; and
    in response to determining that only one of the confidence values exceeds the first threshold value, classifying the at least one object using the classification label corresponding to the one confidence value that exceeds the first threshold value;
    wherein the method is carried out by at least one computing device.

2. The computer-implemented method of claim 1, wherein said filtering comprises at least one of:
    adjusting the confidence value corresponding to at least one of the first classification label and the second classification label; and
    removing at least one of the first classification label and the second classification label from the group of classification labels.

3. The computer-implemented method of claim 1, wherein the word-based data structure comprises a graph comprising:
    first nodes corresponding to a plurality of classification labels, wherein the plurality of classification labels comprises the group of classification labels and one or more other classification labels,
    second nodes corresponding to one or more properties, and
    edges defining relationships between the first nodes and the second nodes.

4. The computer-implemented method of claim 3, wherein said ranking is further based on which of the properties the user is most likely to understand, and wherein said ranking comprises:
    determining the properties that the user is most likely to understand based at least in part on a number of edges between a given second node and the plurality classification labels.

5. The computer-implemented method of claim 3, wherein said ranking comprises:
    determining the properties that are capable of reducing the length of the conversation based at least in part on a number edges between a given second node and the first nodes corresponding to only the group of classification labels.

6. The computer-implemented method of claim 3, wherein the relationships between the first nodes and the second nodes comprise one or more of: an atLocation relationship; a hasA relationship; an isA relationship; a capableOf relationship; and a UsedFor relationship.

7. The computer-implemented method of claim 1, wherein the at least one object comprises two or more objects, and wherein said ranking is based at least in part on which properties distinguish between the two or more objects within the image.

8. The computer-implemented method of claim 1, comprising:
    removing a given classification label from the group of classification labels when the confidence value corresponding to the given classification label is below a second threshold value.

9. The computer-implemented method of claim 1, wherein the user input received in response to the question indicates one of a first answer, a second answer, and a third answer.

10. The computer-implemented method of claim 1, wherein the image is provided based on user input.

11. The computer-implemented method of claim 1, wherein the computer-based object recognition process comprises:
    applying a computer vision process to extract the group of classification labels and the corresponding confidence values.

12. A computer program product comprising a computer readable storage medium having program instructions embodied therewith, the program instructions executable by a computing device to cause the computing device to perform at least:

obtaining a group of classification labels and corresponding confidence values for at least one object identified within an image using a computer-based object recognition process;

generating a conversation with a user to resolve ambiguity among two or more of the classification labels in the group, wherein said generating comprises iteratively performing the following when each of the confidence values is below a first threshold value or two or more of the confidence values are above the first threshold value:

using a word-based data structure to identify one or more properties that distinguish between at least a first one of the classification labels and at least a second one of the classification labels within the group, ranking the identified one or more properties based at least in part on which of the properties is capable of reducing the length of the conversation, generating and outputting a question to the user based on the property having the highest rank, and filtering at least one of the first classification label and the second classification label, based at least in part on user input received in response to said outputting; and in response to determining that only one of the confidence values exceeds the first threshold value, classifying the at least one object using the classification label corresponding to the one confidence value that exceeds the first threshold value.

13. The computer program product of claim 12, wherein said filtering comprises at least one of:

adjusting the confidence value corresponding to at least one of the first classification label and the second classification label; and removing at least one of the first classification label and the second classification label from the group of classification labels.

14. The computer program product of claim 12, wherein the word-based data structure comprises a graph comprising:

first nodes corresponding to a plurality of classification labels, wherein the plurality of classification labels comprises the group of classification labels and one or more other classification labels, second nodes corresponding to one or more properties, and edges defining relationships between the first nodes and the second nodes.

15. The computer program product of claim 14, wherein said ranking is further based on which of the properties the user is most likely to understand, and wherein said ranking comprises:

determining the properties that the user is most likely to understand based at least in part on a number of edges between a given second node and the plurality classification labels.

16. The computer program product of claim 14, wherein said ranking comprises:

determining the properties that are capable of reducing the length of the conversation based at least in part on a number edges between a given second node and the first nodes corresponding to only the group of classification labels.

17. The computer program product of claim 12, wherein the computer-based object recognition process comprises:

applying a computer vision process to extract the group of classification labels and the corresponding confidence values.

18. A system comprising:

at least one memory; and at least one processor operably coupled to the at least one memory and configured to:

obtain a group of classification labels and corresponding confidence values for at least one object identified within an image using a computer-based object recognition process;

generate a conversation with a user to resolve ambiguity among two or more of the classification labels in the group, wherein said generating comprises iteratively performing the following when each of the confidence values is below a first threshold value or two or more of the confidence values are above the first threshold value:

using a word-based data structure to identify one or more properties that distinguish between at least a first one of the classification labels and at least a second one of the classification labels within the group, ranking the identified one or more properties based at least in part on which of the properties is capable of reducing the length of the conversation, generating and outputting a question to the user based on the property having the highest rank, and filtering at least one of the first classification label and the second classification label, based at least in part on user input received in response to said outputting; and in response to determining that only one of the confidence values exceeds the first threshold value, classify the at least one object using the classification label corresponding to the one confidence value that exceeds the first threshold value.

19. The system of claim 18, wherein said filtering comprises at least one of:

adjusting the confidence value corresponding to at least one of the first classification label and the second classification label; and removing at least one of the first classification label and the second classification label from the group of classification labels.

20. The system of claim 18, wherein the word-based data structure comprises a graph comprising at least:

first nodes corresponding to a plurality of classification labels, wherein the plurality of classification labels comprises the group of classification labels and one or more other classification labels, second nodes corresponding to one or more properties, and edges defining relationships between the first nodes and the second nodes.

* * * * *